United States Patent [19]

Brane et al.

[11] 4,359,384

[45] Nov. 16, 1982

[54] SELF-LOCKING FILTER VALVE

[76] Inventors: Earl P. Brane, 9470 Ulmerton Rd., Largo, Fla. 33541; Douglas K. Brane, 3 N. Pine Cir., Belleair, Fla. 33516; Hilton H. Hammond, 6644 Gulfport Blvd., St. Petersburg, Fla. 33707

[21] Appl. No.: 213,822

[22] Filed: Dec. 8, 1980

[51] Int. Cl.³ .............................................. B01D 35/02
[52] U.S. Cl. ................................................... 210/100
[58] Field of Search ................ 210/100, 420, 448, 449

[56] References Cited

U.S. PATENT DOCUMENTS 1,906,767  5/1923  Roberts ............................... 210/100
3,410,411  11/1968  Dence ................................. 210/100
3,853,761  12/1974  McClory ............................. 210/100

*Primary Examiner*—John Adee
*Attorney, Agent, or Firm*—Woodard, Weikart, Emhardt & Naughton

[57] ABSTRACT

A lever actuated valve stem for control of liquid flow through a filtering device. The device is connectable to a source of impure liquids and includes a filter disposed between the inlet and the outlet of the device for the removal of the impurities. The valve stem is operable to direct fluid flow through the filter or to bypass the filter. The valve includes a lever slidably connected to a valve stem by means of a pin fixably attached to the lever and extending through a slot of the stem. The slot is arranged relative to the longitudinal axis of the stem to lock the pin and lever in either the filtering position or the bypass position.

1 Claim, 7 Drawing Figures

SELF-LOCKING FILTER VALVE

BACKGROUND OF THE INVENTION

This invention is in the field of valves used to control flow of liquids. In U.S. Pat. No. 3,853,761, issued to Robert M. McClory, there is disclosed a filter attachable to a water faucet for removing impurities from water. A pushbutton actuated stem is operable to direct the liquid either through the filter or through a passage bypassing the filter.

Disclosed herein is a filter identical to the aforementioned McClory filter with the exception that the McClory pushbutton actuated valve stem is replaced with a lever actuated valve stem thereby increasing the life and reliability of the device. Further, the new lever actuated valve stem is designed to be retrofitted into the McClory filter. Advantages of the lever actuated valve stem will be apparent in the specification hereof.

SUMMARY OF THE INVENTION

Figure 1:
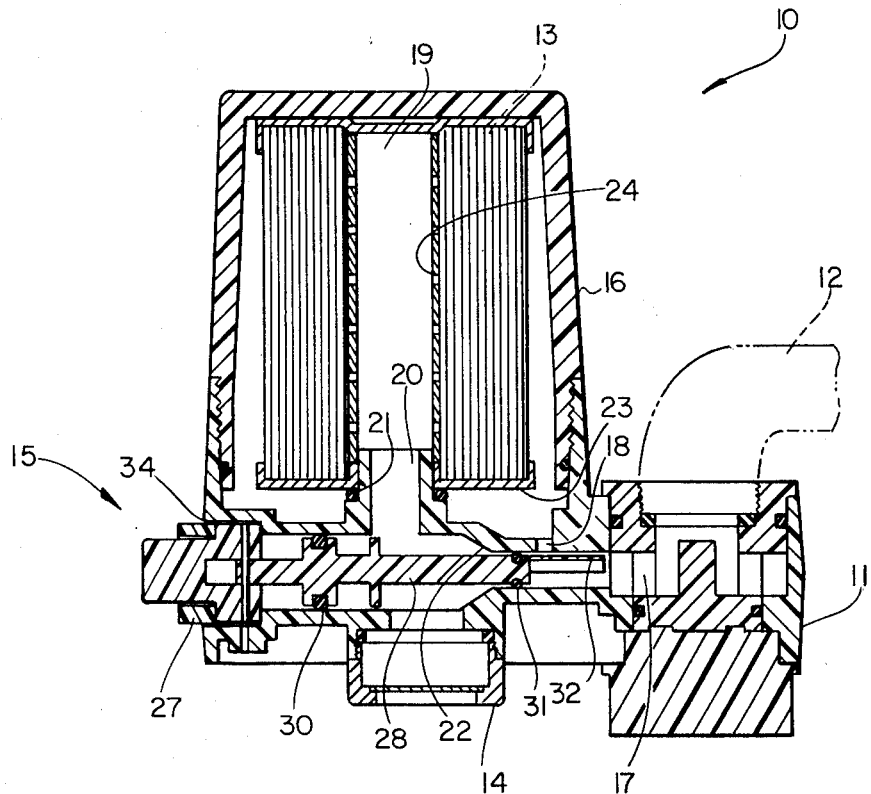
FIG. 1 is a cross sectional view of the filtering device incorporating the new lever actuated valve stem.

One embodiment of the present invention is a device for filtering impure liquids comprising liquid flow control means having an inlet and an outlet, a filter removably mounted to the control means and having a first side in communication with the inlet and a second side communicating with the outlet, passage means within the control means defining a liquid flow passage between the inlet and the outlet other than through the filter, selectively operable valve means associated with the passage means and having a first position for permitting liquid flow between the inlet and the outlet through the passage means bypassing the filter and a second position for preventing liquid flow through the liquid flow passage whereby liquid flow is directed from the inlet through the filter to the outlet, the valve means including a slidably mounted valve stem extendable through the liquid flow passage along a longitudinal axis to control liquid flow therein and a lever projecting externally of the control means for manually grasping and connecting means pivotally mounting the lever to the stem being operable together with the liquid pressure within the control means to lock the lever and stem in the first position until manually moved and to lock the lever and stem in the second position until manually moved.

A further embodiment of the present invention is a self-locking valve comprising a valve housing having a liquid inlet and a liquid outlet with a main passage extending therebetween and a side passage having opposite ends opening into the main passage, a valve stem slidably mounted in the main passage and movable from a first position whereat liquid flow is directed through the main passage bypassing the side passage, and first means including a lever pivotally movable about a pivot axis and slidably connected to the stem being operable for movement of the lever offset relative to the stem when the stem moves to the first position and second position, locking the stem in position until manual movement of the lever.

It is the object of the present invention to provide a new and improved device for filtering impure liquids.

A further object of the present invention is to provide a self-locking valve installable into a device for filtering impure liquids.

Yet another object of the present invention is to provide a valve for controlling liquid flow lockable in the on and off positions.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a filtering device 10 for controlling the flow of liquid. Device 10 is identical to the device disclosed in U.S. Pat. No. 3,853,761 issued to Robert M. McClory, which is hereby incorporated by reference with the exception that the pushbutton actuatable valve stem is replaced by a lever actuated valve stem 15 disclosed herein. Device 10 includes a main body 11 removably connectable to a source of liquid such as a faucet 12. The valve stem is actuatable to direct the liquid or water flowing from faucet 12 through either a replaceable filter 13 and then to outlet 14 or directly from faucet 12 to outlet 14.

A hollow cylinder 16 has a closed top end and an open bottom end threadedly received and mounted to main body 11. Cylinder 16 may be removed for the removal of an old filter 13 and installation of a new filter. A main passage 17 is provided in main body 11 extending from faucet 12 and opening into outlet 14. A side passage 18 extends from passage 17 into cylinder 16 allowing the water to flow through filter 13 having a central passage 19 opening into passage 20 leading to outlet 14. Filter 13 is sealed by means of an O-ring 21 in turn extending around the portion of main body 11 forming passage 20 thereby insuring that water flowing into cylinder 16 from passage 18 is directed through filter 13 to central passage 19 and then out passage 20 to outlet 14.

Stem 15 is shown in FIG. 1 in the on or filtering position directing liquid flow from passage 17 through passage 18 to filter 13. Passage 17 is enlarged at location 22 thereby allowing the liquid within passage 17 to bypass passage 18 and flow directly to outlet 14 when the valve 15 is moved to the left, as viewed in FIG. 1.

The main body 11 of filter 10 acts as a liquid flow control means having an inlet connected to faucet 12 and an outlet 14. Filter 13 is removably mounted to main body 11 and has a first side 23 in communication with inlet 12 via passages 17 and 18 and an interior or second side 24 communicating with outlet 14 via passage 20 whenever the valve stem 15 is in the inward position. Passage 17, as enlarged at location 22, acts as a means to define a liquid flow passage between the inlet 12 and outlet 14 other than through filter 13.

Figure 2:
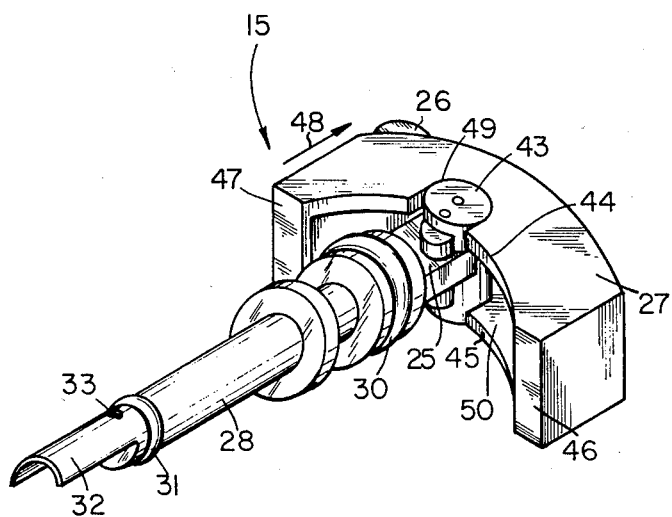
FIG. 2 is an enlarged perspective view of the lever actuated valve stem.

Valve stem 15 (FIG. 2) has an elongated main body connected to lever 26 retained within housing 27 fittable into main body 11 of device 10. The stem main body has a solid rod portion 28 integrally attached to a plate 25 with an O-ring seal 30 positioned therebetween. A curved thin wall 32 is integrally attached to the distal end of the rod configured portion 28 of the valve stem with a conventional O-ring seal 31 extending around rod configured portion 28 and positioned between portion 28 and the thin curved wall 32. Wall 32 opens downwardly when the valve stem is installed in the filtering device and has an aperture 33 extending through wall 32 allowing liquid flow from passage 17 into passage 18 when the valve stem is positioned in the inward or filtering position such as shown in FIG. 1. O-ring seal 31 sealingly engages main body 11 when the valve stem is in the inward or filtering position preventing liquid flow passing directly from passage 17 to outlet 14. As the valve stem is moved to the left, as viewed in FIG. 1, O-ring seal 31 moves adjacent the enlarged portion 22 allowing liquid flow from passage 17 directly to outlet 14. O-ring seal 30 engages main body 11 at all times preventing liquid flow from passage 17 into cavity 34 mountingly receiving housing 27.

Figure 6:
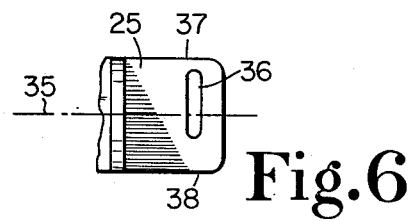
FIG. 6 is a fragmentary top plan view of plate 25 shown in FIG. 3.

Valve stem 15 is movable along longitudinal axis 35 (FIG. 3) extending centrally through rod configured portion 28 and plate 25. Slot 36 (FIG. 6) extends completely through plate 25 and is located off-center relative to axis 35. FIG. 6 is the same view as FIG. 3 only showing the top plate fragmented and removed from lever 36. As viewed in FIG. 6, slot 36 extends closer to edge 37 of plate 25 than to edge 38 of the plate. Slot 36 extends slightly past longitudinal axis 35 towards edge 38, a distance slightly greater than the diameter of pin 39 (FIG. 3) slidably attaching valve stem 15 to lever 26.

Figure 5:
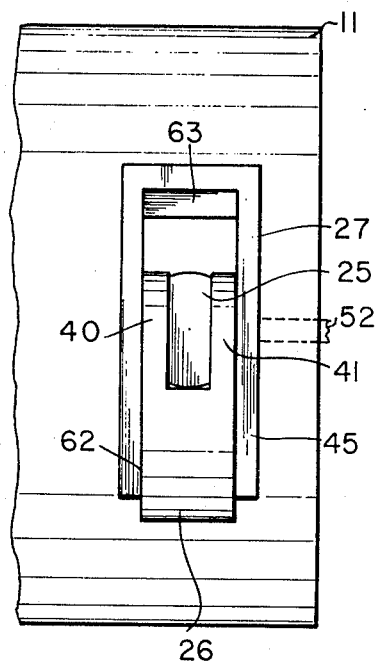
FIG. 5 is an enlarged fragmentary end view looking in the direction of arrows 5—5 at FIG. 4.
Figure 7:
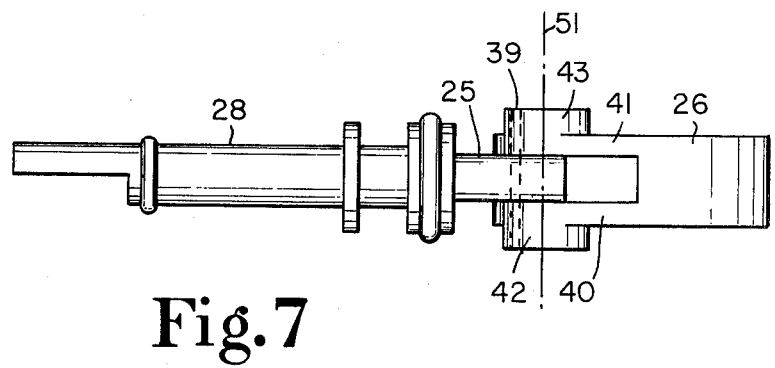
FIG. 7 is a side view of the valve stem shown in FIG. 3 only with housing 27 removed therefrom.

The main body of lever 26 has a bifurcated inner end forming two arms 40 and 41 (FIG. 5) between which is positioned plate 25. Arms 40 and 41 (FIG. 7) have, respectively, discs 42 and 43 integrally attached thereto. The discs are received in a semi-circular recess 49 (FIG. 2) provided on the opposite sidewalls 44 and 45 of housing 27. Sidewalls 44 and 45 are integrally attached to end walls 46 and 47 and are spaced apart forming opening 50 extending completely through housing 27 and allowing lever 26 to be slipped through the housing in the direction of arrow 48 when initially assembled until discs 42 and 43 are received in recesses 49 provided in walls 44 and 45. Longitudinal axis 35 extends centrally through the pivot axis 51 (FIG. 7) of discs 42 and 43. Thus, lever 26 pivots about axis 51. A conventional fastening device 52, such as a screw, (FIG. 5) secures wall 45 of housing 27 to main body 11.

Figure 3:
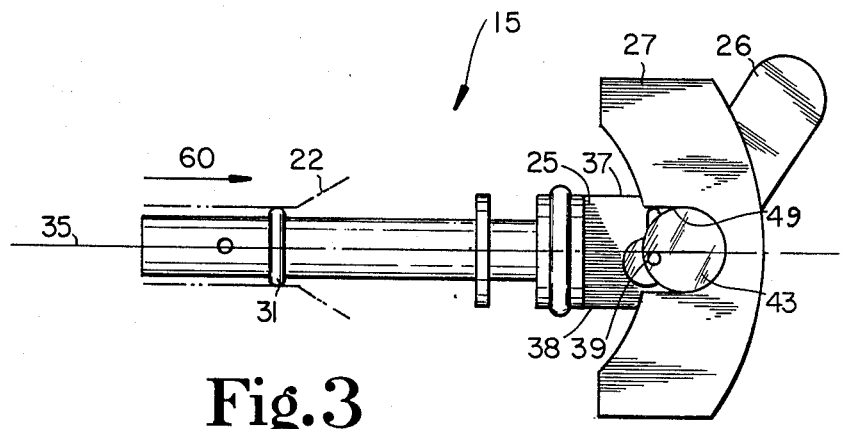
FIG. 3 is a top plan view of the valve stem shown in FIG. 2 with the valve in the filtering position.
Figure 4:
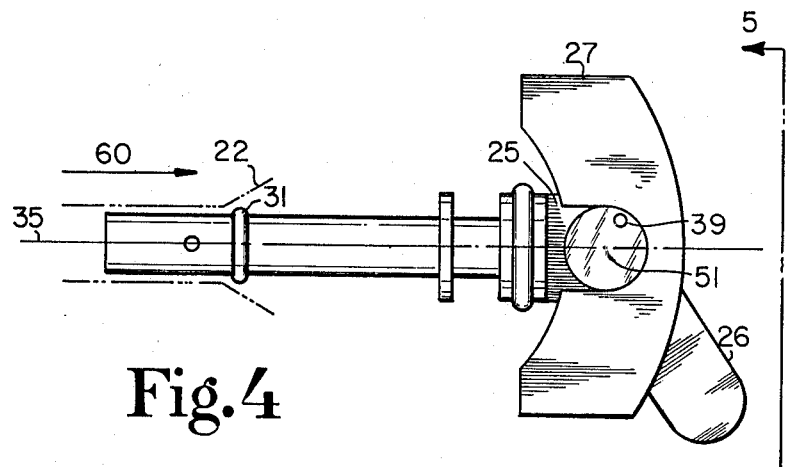
FIG. 4 is the same view as FIG. 3 only showing the valve in the bypass position.

Pin 39 extends through slot 36 of plate 25 and is attached to discs 42 and 43. The pin is positioned beneath longitudinal axis 35 as viewed in FIG. 3 when lever 26 is positioned in the upward or filtering position, whereas the pin is positioned to the uppermost portion of slot 36, as viewed in FIG. 4 when lever 26 is located in the downward or bypass position. In the filtering position of FIG. 3, O-ring seal 31 engages main body 11 surrounding passage 17 directing liquid flow into the filter, whereas with the lever in the downward position shown in FIG. 4, O-ring seal 31 is located along the enlarged portion 22 of the main body allowing liquid flow from the inlet directly to the outlet. End walls 46 and 47 (FIG. 2) form, respectively, stop surfaces 62 and 63 (FIG. 5) against which lever 26 rests. Pressure from the liquid flowing into passage 17 from faucet 12 forces the valve stem in the direction of arrow 60 (FIGS. 3 and 4). Thus, with the valve stem in the inward or filtering position, lever 26 is forced in a counterclockwise direction, as viewed in FIG. 3, due to the location of pin 39 beneath longitudinal axis 35, with lever 26 contacting stop surface 63. Likewise, with the valve stem in the outward or bypass position, liquid pressure forces lever 26 in a clockwise direction against stop surface 62 due to the location of pin 39 above longitudinal axis 35, as viewed in FIG. 4.

The valve stem and lever act as a selectively operable valve means having a first position shown in FIG. 4 permitting liquid flow between the faucet and outlet 14 bypassing filter 13 and further, having a second position shown in FIG. 3 whereby liquid flow is directed from the faucet through filter 13 to outlet 14. Lever 26 projects externally of the main body 11 for manual gripping and operation and is pivotally connected to the main body of the stem to lock the lever and stem in either position shown in FIG. 3 or FIG. 4 until manually moved. The connecting pin 39 forms a connecting axis between the lever and stem main body with the axis movable between the location shown in FIGS. 3 and 4 to opposite sides of longitudinal axis 35 as the lever moves between its opposite extremes. Likewise, stop surfaces 62 and 63 are positioned on opposite sides of longitudinal axis 35 with liquid pressure urging the lever against the stop surfaces when pin 39 is positioned respectively on the opposite sides of longitudinal axis 35. Lever 26 has a fixed pivot axis 51 intersecting longitudinal axis 35 with the connecting axis extending through pin 39 offset from pivot axis 51 and longitudinal axis 35 whenever the lever is positioned adjacent stop surface 62 or 63, thereby locking the lever in place. It should be noted that when lever 26 rests against either stop surface 62 or 63, that the longitudinal axis 35 is positioned between lever 26 and pin 39.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A device for filtering impure liquids comprising:
 liquid flow control means having an inlet and an outlet;
 a filter removably mounted to said control means and having a first side in communication with said inlet and a second side communicating with said outlet;
 passage means within said control means defining a liquid flow passage between said inlet and said outlet other than through said filter;
 selectively operable valve means associated with said passage means and having a first position for permitting liquid flow between said inlet and said outlet through said passage means bypassing said filter and a second position for preventing liquid flow through said liquid flow passage whereby liquid flow is directed from said inlet through said filter to said outlet;

said valve means including a slidably mounted valve stem extendably through said liquid flow passage along a longitudinal axis to control liquid flow therein and a lever projecting externally of said control means for manually grasping and connecting means pivotally mounting said lever to said stem, said connecting means having a connecting axis between said lever and stem with said connecting axis movable between a first location on a first side of said longitudinal axis to a second location on a second side of said longitudinal axis opposite said first side as said valve means moves from said first position to said second position, said connecting means by location of said connecting axis together with said liquid pressure within said control means being operable to lock said lever and stem in said first position until manually moved and to lock said lever and stem in said position until manually moved;

said connecting means includes a slot and a pivot pin slidably associated together and with said stem and lever;

said slot terminates on opposite sides of said longitudinal axis;

said stem includes a proximal end with said slot located thereon;

said lever includes a fixed pivot axis with said pin offset therefrom extending into and slidable within said slot;

said control means includes a first stop and a second stop with said longitudinal axis extending therebetween, said stem urged by liquid pressure within said control means releasably holds said lever against said first stop with said longitudinal axis positioned between said pin and said first stop, and holds said lever against said second stop when said longitudinal axis is positioned between said pin and said second stop.

* * * * *